H. ANGEBRANDT, Jr.
THERMOSTATIC TEMPERATURE REGULATOR FOR GLUE HEATERS.
APPLICATION FILED AUG. 25, 1910.
1,007,172.  Patented Oct. 31, 1911.
2 SHEETS—SHEET 1.
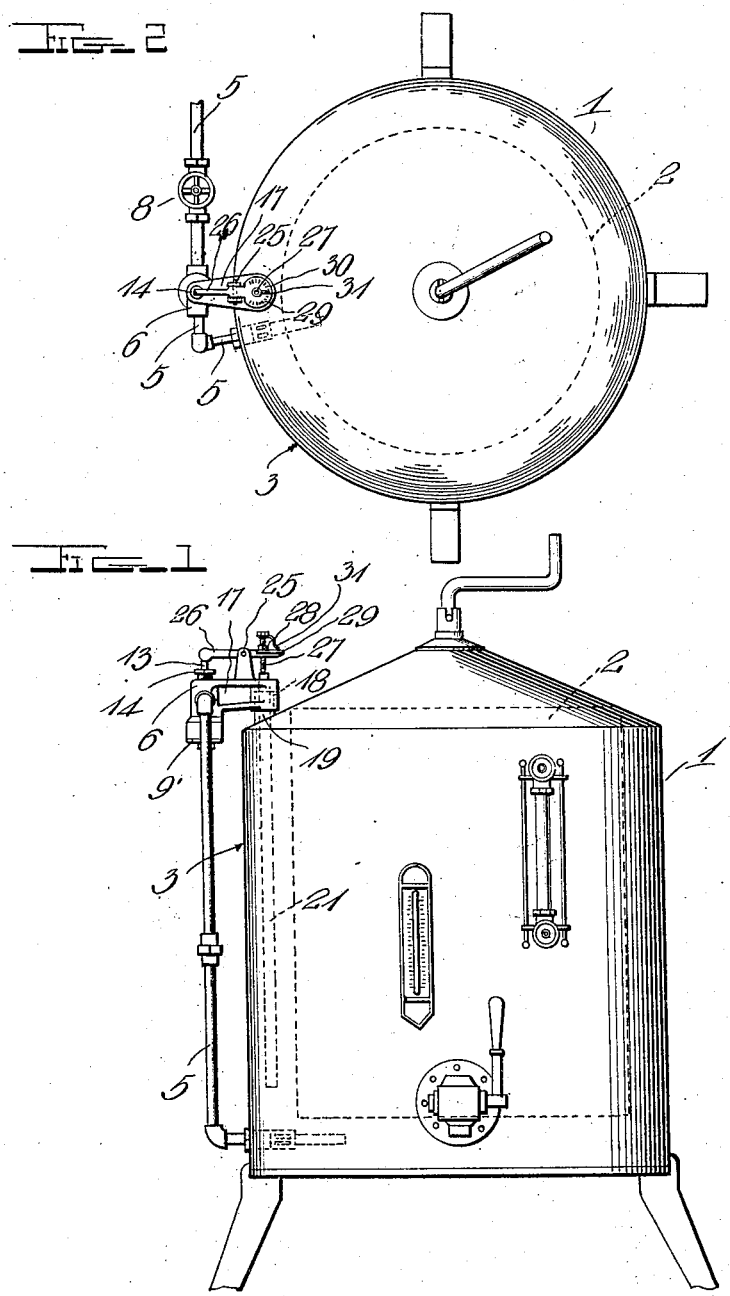

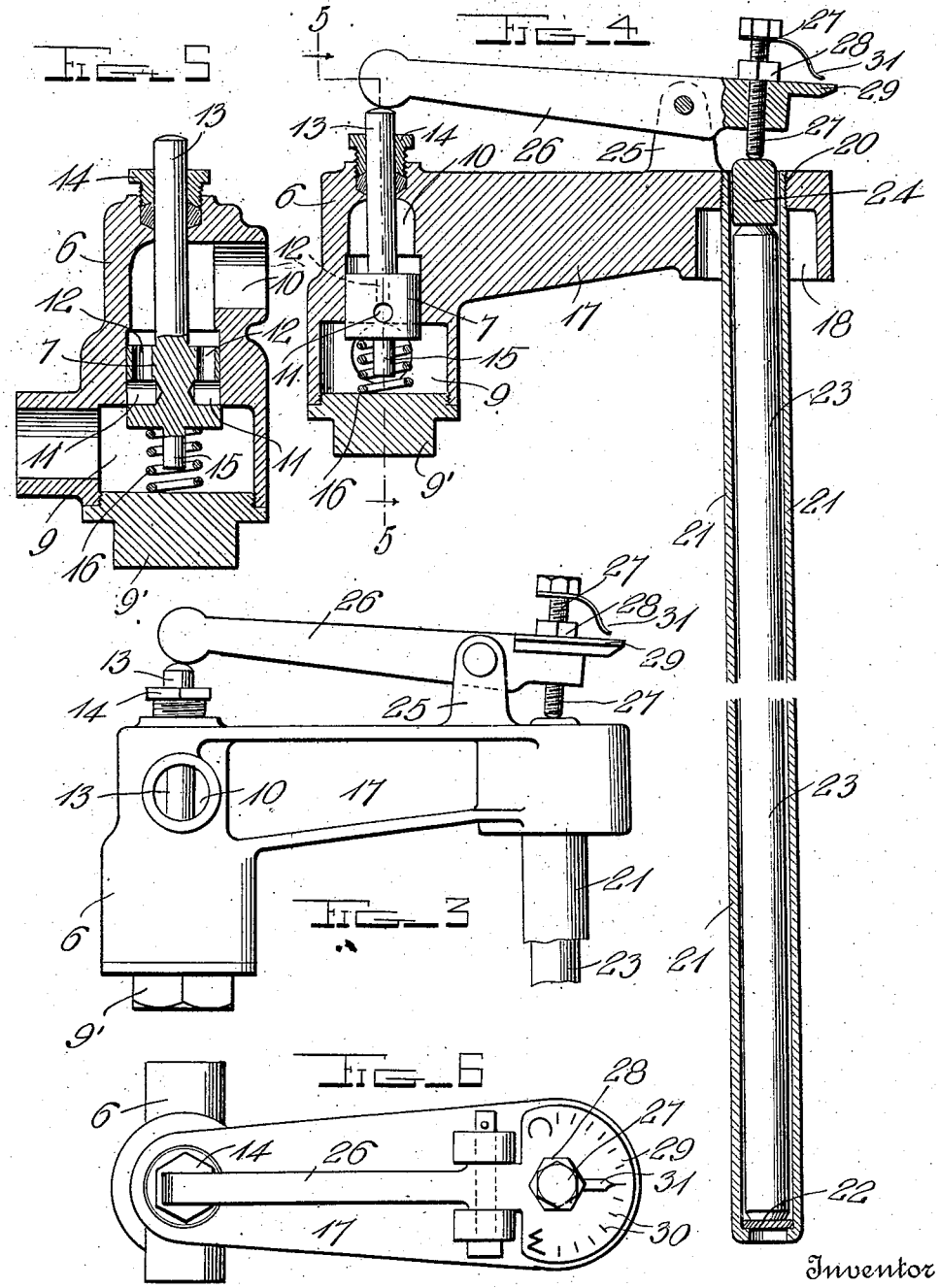

UNITED STATES PATENT OFFICE.

HUBERT ANGEBRANDT, JR., OF TOLEDO, OHIO.

THERMOSTATIC TEMPERATURE-REGULATOR FOR GLUE-HEATERS.

1,007,172.

Specification of Letters Patent. Patented Oct. 31, 1911.

Application filed August 25, 1910. Serial No. 578,858.

*To all whom it may concern:*

Be it known that I, HUBERT ANGEBRANDT, Jr., a citizen of the United States, residing at Toledo, in the county of Lucas and State of Ohio, have invented certain new and useful Improvements in Thermostatic Temperature-Regulators for Glue-Heaters; and I do declare the following to be a full, clear, and exact description of the invention, such as will enable others skilled in the art to which it appertains to make and use the same.

This invention relates to improvements in thermostatic temperature regulators for glue heaters.

One object of the invention is to provide an improved direct acting thermostat adapted to be applied to a glue heater whereby the temperature of the heating fluid is automatically controlled.

Another object is to provide a thermostat which will operate and automatically control itself under steam pressure and which is provided with a valve that cannot become clogged under any steam heating conditions.

With the above and other objects in view, the invention consists of certain novel features of construction, combination and arrangement of parts as will be more fully described and particularly pointed out in the appended claim.

In the accompanying drawings:—Figure 1 is a side view of a glue heating tank partly in section showing the application of the invention; Fig. 2 is a top plan view of the same; Fig. 3 is an enlarged side view of the thermostat and steam supply valve removed from the tank; Fig. 4 is an enlarged vertical section of the thermostat and the steam supply valve controlled thereby; Fig. 5 is a similar view at right angles to and on the line 5—5 of Fig. 4; Fig. 6 is a top plan view of the valve and its operating lever showing the indicating device for the thermostat adjusting mechanism.

Referring more particularly to the drawings, 1 denotes the glue heating tank which may be of the usual or any desired construction and is here shown as comprising an inner glue receptacle 2 and an outer steam and water receptacle 3. To the lower portion of the outer or water receptacle of the tank is connected a steam supply pipe 5 the inner end of which enters the lower portion of the water space of the tank. The steam supply pipe 5 is preferably extended upwardly from its connection with the tank to a point adjacent to the upper end thereof at which point the steam supply pipe 5 projects horizontally and has arranged therein the casing 6 of an automatic steam controlling valve 7. In the steam pipe 5 is also arranged a manually operated cut off valve 8. In the lower portion of the valve casing 6 is formed a steam inlet chamber 9 which is closed at its lower end by a screw cap 9'. With the chamber 9 of the valve casing is connected one section of a steam supply pipe while the opposite section thereof is connected to the upper portion or discharge chamber 10 of the valve casing as clearly shown in Fig. 5 of the drawing. In the valve 7 are formed steam inlet ports 11 and steam discharge ports 12 through which the steam passes from the inlet chamber 9 to the discharge chamber 10 of the valve casing. The valve 7 is provided on its upper end with an upwardly projecting guide stem 13 which extends through a suitable stuffing box arranged in the upper end of the valve casing as shown. On the lower end of the valve is formed a downwardly projecting stud 15 around which and between the lower end of the valve and the inner end of the cap 9' is arranged a coiled spring 16, the pressure of which, in conjunction with the pressure of the steam is exerted to normally close and hold the valve 7 in closed position.

The valve casing 6 is provided on one side with a right angularly projecting attachment and thermostat supporting arm 17 in the inner end of which is formed a socket 18 which is adapted to engage an upwardly projecting nipple 19 formed on the upper end of the outer receptacle of the glue tank as shown. In the end of the arm 17 having the socket 18 is arranged a threaded passage 20 in which is screwed the upper end of a tubular thermostat 21 which projects downwardly into the water space between the glue and water receptacles of the tank as shown. The lower end of the tube 21 is closed by a suitable closing disk 22 arranged therein as shown. Arranged in the thermostat tube 21 is a non-expanding porcelain inner rod 23 the lower end of which rests on the disk 22, while on the upper end thereof within the upper portion of the outer tube 21 is arranged a metal bearing block 24.

Pivotally mounted in a bearing bracket 25 on the upper end of the arm 17 is a operating lever 26 one end of which engages the upper end of the valve stem 13, while in the other end is arranged an adjustable thermostat engaging screw 27 by means of which the movement of the valve 7 by the thermostat may be regulated. On the screw 27 is arranged a jam nut 28 which is adapted to be screwed into engagement with the lever to rigidly hold the screw in its adjusted position.

On the pivoted end of the lever 26 is formed a segmental index plate 29 on which is arranged an indicating scale 30 with which there is adapted to coact an indicating finger or pointer 31 carried by the adjusting screw whereby the position to which the screw has been turned and the corresponding distance to which the valve is permitted to open will be indicated.

In the operation of the device the screw 27 is adjusted to a position for holding the valve open to the desired extent for admitting steam to the glue tank. When the water in the outer receptacle of the tank has become thus heated to the desired or predetermined temperature the thermostat tube 21 will expand thus allowing the porcelain inner rod to move downwardly under pressure of the steam on the under side of the valve 7 in conjunction with the pressure exerted by the spring 16 through the valve, lever 26, and screw 27 which will permit said spring to close the valve, thus cutting off the supply of steam to he glue tank until the water therein has cooled to a sufficient extent to again cause the contraction of the thermostat tube whereupon the porcelain rod 23 will again be forced upwardly, thus rocking the lever 26 and causing the same to again open the valve which will admit a further supply of steam thus automatically maintaining the water in the tank at a certain temperature which may be determined by the adjusting screw 27 and indicated by the pointer or indicating finger 31 carried by the screw.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In combination with a glue receiving tank having a surrounding heating space, of an arm projecting from the top of the tank, a thermostat secured to one end of said arm and supporting the latter, said thermostat comprising an expanding tube depending into the heating space and having a closed bottom, a non-expanding rod slidably located within the tube, a block movable within the tube and resting upon the upper end of the rod, a lever fulcrumed on said arm, an adjusting screw carried by the short arm of the lever the lower end of which contacts with the upper projecting end of the block, means carried by the said adjusting screw and coöperating with a scale arranged on said end of the lever whereby the position to which the screw has been turned is indicated, a spring actuated valve located in the opposite end of the arm, a stem forming a part of the valve and projecting above the arm and adapted to contact with the free end of the long arm of the lever, and pipe connections leading from the valve and communicating with the heating space below the glue tank.

In testimony whereof I have hereunto set my hand in presence of two subscribing witnesses.

HUBERT ANGEBRANDT, Jr.

Witnesses:
DANIEL HOFFMAN,
NINA E. TURNER.